A. K. WEIDERER.
DIMMER.
APPLICATION FILED MAR. 7, 1917.
1,235,620.
Patented Aug. 7, 1917.
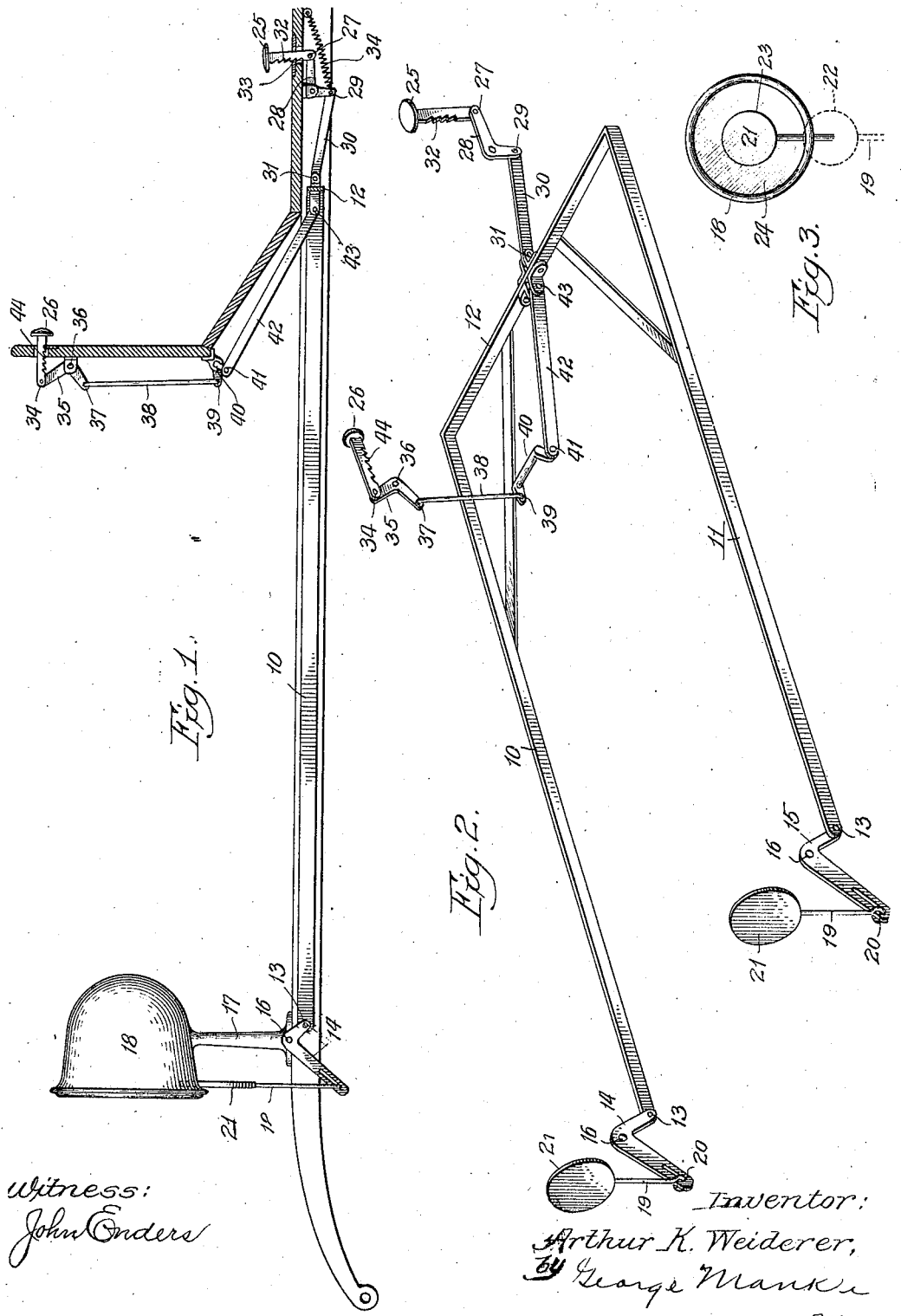
Witness:
John Enders
Inventor:
Arthur K. Weiderer,
by George Manke
Atty.

UNITED STATES PATENT OFFICE.

ARTHUR K. WEIDERER, OF CHICAGO, ILLINOIS.

DIMMER.

1,235,620.     Specification of Letters Patent.     Patented Aug. 7, 1917.

Application filed March 7, 1917. Serial No. 153,007.

*To all whom it may concern:*

Be it known that I, ARTHUR K. WEIDERER, a citizen of the United States, residing at Chicago, in the county of Cook and State of Illinois, have invented a certain new and useful Dimmer, of which the following is a full, clear, and exact description, reference being had to the accompanying drawing, which forms a part of the specification.

The object of my invention is to provide a device for reducing the blinding glare of the head lights of automobiles or other vehicles or cars so as to remove a frequent cause of danger and accidents and to comply with city ordinances and other municipal and State regulations. Another object of my invention is to provide a dimmer so simple in construction as to secure a maximum of operative value at a minimum cost and so arranged as to require positive action on the part of the driver to produce the dimming when desired, and thus incapable of being accidentally operated, at a time undesired, by the jar or movement of the vehicle or car. A further object of my invention is to provide a device which may be operated by the driver or motorman without leaving his regular place; another object of my invention is to provide a device which may be applied to any and all styles and types of vehicles and cars and which may be operated either by foot or by hand or alternately.

Referring to the accompanying drawing, Figure 1 is a side elevation partly in section. Fig. 2 is a plan view thereof; Fig. 3 is a detailed view of the headlight showing different positions of the dimmer. Referring to the details of my invention shown in the drawing, I first provide a frame consisting of the two side members 10, 11 which extend longitudinally along the sides of the car body and are joined together by the member 12, thus forming three sides of a rectangular frame. Each of the side members 10 and 11 of the frame engages with a bell crank 14, 15 at the front end of the car by means of bolts or other flexible connection as at 13. The bell crank is pivoted at 16 to the foot 17 of the lamp 18. The forward end of the bell cranks 14, 15 engages with an upright arm 19 as shown at 20. This upright arm 19 supports a dimmer 21 which may be of any suitable arrangement and material to obscure a portion of the light rays when raised from the position 22 to the position 23 shown in Fig. 3, in the front of the lamp 18. When the dimmer is in the position 23, the only light rays permitted to escape are through the circular space 24 lying between the dimmer and the outer circumference of the lamp globe. The light thus permitted to escape when the dimmer is in position 23 is of a quality and quantity which will not glare or blind either pedestrians or drivers who may be approaching the car from the front.

I operate my dimmer either by means of the foot control 25 or the hand control 26. As shown in Fig. 2, it will be seen that the foot control 25 is connected by bolts or other suitable flexible means at 27 to a bell crank 28 which in turn is connected by bolts or other similar flexible means at 29 to an arm 30 which in turn is suitably connected with the member 12 of the frame at 31. When it is desired to bring the dimmer 21 from the position 22 to position 23, all the driver of the car needs to do is to push down on the foot control 25, whereupon, the action is transmitted through the various parts described and the entire frame moved forwardly and the dimmer upwardly into position 23 where it is held by means of engagement of the teeth 32 on the foot control 25 with the notches 33. When it is desired to release the foot-control and bring the frame and dimmer back to their respective normal positions, the operator can release the foot-control with the foot and lift the hand lever, whereupon the spring 34 will draw the frame back to its normal position returning the dimmer 21 from position 22 to position 23. I have also provided means whereby the dimmer may be operated by a hand-control 26. I have placed this control in the front of the dash-board convenient of access. This mechanism consists of the handle 26 which passes through the dashboard and is connected by bolts or other flexible means at 34 to a bell crank 35 which is pivoted at 36 and flexibly connected at 37 to an arm 38 which in turn is flexibly connected at 39 to a crank arm 40. This crank arm is flexibly connected at 41 with an arm 42 which is connected at 43 with the member 12 of the frame. When it is desired to operate the dimmer by means of this hand-control, all that is necessary for the operator to do is to pull the lever 26 toward him, thus transmitting a forward movement through all of the parts just described operating to move the entire frame forward and the dimmer upward, thus moving the dimmer from position 22 to position 23. On the hand-control 26 are provided teeth 44 which engage with notches 45 to hold it in place as desired.

I have provided both foot and hand-control so that either may be used as best suits the needs of the operator either as to the vehicle or car upon which the equipment is installed or as to conditions surrounding the operator—such as roads or tracks, or whether operated at night or in day-light, in cold weather or in warm weather.

It will be seen that my device can be very economically, simply and easily applied either to new or old vehicles or cars without in any way interfering with any of the other parts or functions of such car or vehicle. When not in use, the lamps of the car operate to their full normal capacity as though the dimmer apparatus were not installed. When it is desired to reduce the glare of the light so as to avoid danger and accident and comply with city and other municipal and State ordinances and requirements, the dimmer may be quickly and easily operated to secure a proper dimming without the driver or operator leaving his seat or operating position.

Having thus described my invention, what I claim is:

1. In a device of the class described, a frame, a foot control connected therewith, a pair of light dimming devices at the opposite end of the frame, means for moving the frame forwardly and the dimming devices upwardly and means for automatically drawing the frame and dimming devices back to normal position when the foot control is released.

2. In combination with a pair of lamps, a frame having a pair of dimming devices at one end and at the opposite end foot and hand controlling means whereby the frame is moved forwardly and the dimming devices upwardly for the purposes described.

3. In a device of the class described, a frame having two parallel side-bars connected at one end by a similar bar, a dimming device at each of the free ends of said side-bars, a pair of lamps designed to receive said dimming devices, a foot-control at the closed end of said frame so arranged that when pushed downwardly the frame will be moved in the direction of the lamps and the dimmers raised upwardly in the lamps.

4. In a device of the class described, a frame having two parallel side-bars connected at one end by a similar bar, a dimming device at each of the free ends of said side-bars, a pair of lamps designed to receive said dimming devices, a foot control at the closed end of said frame so arranged that when pushed downwardly the frame will be moved in the direction of the lamps and the dimmers raised upwardly in the lamps, means for holding the foot-control in downward position and a spring for drawing the frame and the dimming devices back to normal position when the foot-control is released.

5. In a device of the class described, a frame having two parallel side-bars connected at one end by a similar bar, a dimming device at each of the free ends of said side-bars, a pair of lamps designed to receive said dimming devices, a hand-control at the closed end of said frame so arranged that when pulled toward the operator, the frame will be moved in the direction of the lamps and the dimmers raised upwardly in the lamps.

6. In a device of the class described, a frame having two parallel side-bars connected at one end by a similar bar, a dimming device at each of the free ends of said side-bars, a pair of lamps designed to receive said dimming devices, a hand control at the closed end of said frame so arranged that when pulled toward the operator the frame will be moved in the direction of the lamps and the dimmers raised upwardly in the lamps, means for holding the hand-control in forward position and a spring for drawing the frame and the dimming devices back to normal position when the hand-control is released.

In witness whereof, I hereunto subscribe my name to this specification in the presence of two witnesses.

ARTHUR K. WEIDERER.

Witnesses:
I. V. CURRAN,
M. STEINBRECHER.